United States Patent [19]

Batjuk

[11] Patent Number: 5,934,708

[45] Date of Patent: Aug. 10, 1999

[54] DICTIONARY OF AN ALPHABETIC FOREIGN LANGUAGE

[76] Inventor: Vladimir Grigorievich Batjuk, Ukraine, Kiev, prospekt Glushkova d. 24, kv. 70, Ukraine

[21] Appl. No.: 09/005,990

[22] Filed: Jan. 12, 1998

[30] Foreign Application Priority Data

May 22, 1997 [UA] Ukraine ................................ 97052363

[51] Int. Cl.[6] ............................ G09B 19/06; G09B 19/08
[52] U.S. Cl. ............................... 283/46; 283/45; 283/117; 434/157; 434/159
[58] Field of Search ............................... 283/45, 46, 117; 434/157, 159

[56] References Cited

U.S. PATENT DOCUMENTS 4,807,905  2/1989  Reagan ................................... 281/15 R

FOREIGN PATENT DOCUMENTS 9031  9/1996  Ukraine .

*Primary Examiner*—Willmon Fridie, Jr.
*Assistant Examiner*—Mark T. Henderson
*Attorney, Agent, or Firm*—Ladas & Parry

[57] ABSTRACT

A dictionary of an alphabetic foreign language is an information carrier on which marked-off groups (4–10) of words (3) of the foreign language are positioned. A translation (13) and transcription (12) are provided adjacent to each word of the foreign language. Words, which have an identical sequence (11) of letters, comprising at least one third of the letters in the words, in the direction from the end to the beginning of a word, are combined into a group (4–10). Wherein, each group is positioned sequentially with respect to another group of words, the aforesaid sequence (11) of letters of which comprises the greatest number of coinciding letters in the direction from the end to the beginning of a word. The groups (4–10) of words are separated one from another by a separating element (14), for example, by marking the group or by an empty space (15) on the carrier. The number of groups is not limited. The dictionary may be made in the form of a book in which sections (1, 2) comprise words (3) of a foreign language, which have an identical final letter, in the form of sequential groups arranged into a column. Their translation (13) and/or transcription (12) is provided in another column.

24 Claims, 1 Drawing Sheet

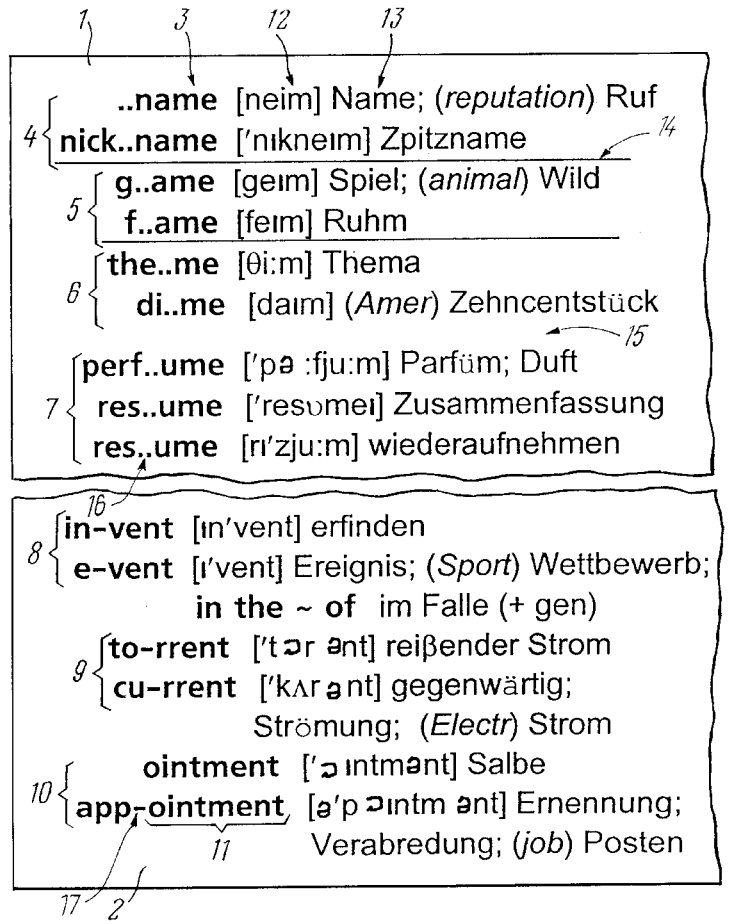

..name [neɪm] Name; (*reputation*) Ruf
nick..name ['nɪkneɪm] Zpitzname g..ame [geɪm] Spiel; (*animal*) Wild
f..ame [feɪm] Ruhm the..me [θiːm] Thema
di..me [daɪm] (*Amer*) Zehncentstück perf..ume ['pə:fjuːm] Parfüm; Duft
res..ume ['resʊmeɪ] Zusammenfassung
res..ume [rɪ'zjuːm] wiederaufnehmen in-vent [ɪn'vent] erfinden
e-vent [ɪ'vent] Ereignis; (*Sport*) Wettbewerb; in the ~ of im Falle (+ gen)

to-rrent ['tɔrənt] reißender Strom
cu-rrent ['kʌrənt] gegenwärtig; Strömung; (*Electr*) Strom ointment ['ɔɪntmənt] Salbe
app-ointment [ə'pɔɪntmənt] Ernennung; Verabredung; (*job*) Posten

5,934,708

DICTIONARY OF AN ALPHABETIC FOREIGN LANGUAGE

FIELD OF THE INVENTION

The invention relates to means for teaching foreign languages, in particular languages having an alphabet. It is aimed at compiling a plurality of groups of words of a foreign language in a certain sequence according to the final letters and may be used to memorize spelling, pronunciation and translation of words of the language being studied.

BACKGROUND ART

A usual dictionary of foreign words comprises a sequential arrangement of words in alphabetic order with a transcription and translation. Such dictionaries are used to translate and learn foreign words in texts. Wherewith a lot of time is to be spent on searching for, rewriting and then memorizing the words.

A dictionary is known in which a plurality of words are arranged into sequential groups in the form of columns, in each of which the plurality of words have an identical final syllable; the sequential groups are positioned in alphabetic order in accordance with the final syllable; the plurality of words in each sequential group are positioned in alphabetic order (see U.S. Pat. No. 4,807,905, class 281/15, 1989). A book which comprises a plurality of words in a first section which are arranged into columns in alphabetic order is described in this same patent document; in a second section there is a plurality of single-syllable words from the first section and in a third section a plurality of multi-syllable words from the first section, positioned in sequential groups in each of which the words have an identical final syllable, wherein the aforesaid sequences of groups are positioned in alphabetic order according to the letters forming the final syllable, this also being described in the same patent document.

This arrangement of a plurality of words in this known solution makes it possible to find any word rapidly and easily in order to define its correct spelling. However, the principle of arranging the words in the known dictionary does not make it possible to reduce the time necessary to learn the words of a foreign language. Furthermore, it cannot serve as a means of learning foreign languages since all the information necessary for that purpose is not provided therein.

A dictionary of an alphabetic foreign language is also known, which is made in the form of an information carrier on which a plurality of words of a foreign language are sequentially positioned, wherein words which differ from each other by at least one letter and contain an identical sequence of letters, comprising at least one third of the letters in a word in the direction from the end to the beginning of a word, are combined into marked-off groups corresponding to those sequences, and a corresponding translation and/or transcription thereof is accordingly provided adjacent to each word of the foreign language. The aforesaid groups of words are positioned freely in the dictionary (see Ukrainian patent No. 9031, class G 09 B 19/06, 19/08, published Sep. 30, 1996).

Graphical marks which are used during writing, typing or other means of reproducing words of an alphabetic language are also related to letters below.

Each of the aforesaid groups is a dictionary which can be used to memorize a limited number of words of a foreign language. Since words are memorized in the direction in which they are read, the letters at the beginning of a word are memorized easier than those at the end, and, just the same, it is easier to memorize words with fewer letters. Therefore the aforesaid groups of words are arranged so that identical final letters of a repeating sequence of letters in a group only need to be memorized once for all the words which the group contains. The greater the number of words in the group, the relatively less the time required to memorize each word.

In a dictionary containing from hundreds to tens of thousands of words, there is a large number of the aforesaid groups. Wherein, groups of words having an identical final letter are formed so that the sequence of final letters of one group includes therein the sequence of another group or the final part of such a sequence in the direction from the end of a word to its beginning. Wherein, when the number of identical letters in the sequence increases, the number of words in the group is reduced. Therefore, when the groups are freely set down in a dictionary, it takes a relatively long time to memorize the words.

SUMMARY OF THE INVENTION

The object of the invention is to create a dictionary of an alphabetic foreign language in which a new mutual arrangement of a plurality of formed groups of foreign words with identical letters, starting from the end of the word, would make it possible to reduce the time necessary to memorize their spelling, pronunciation and translation.

The object of the invention is also to create a dictionary of an alphabetic foreign language in the form of a book which is an information carrier for a plurality of words of a foreign language, which are arranged in accordance with the invention in such a manner that the time necessary to memorize the spelling, pronunciation and translation of the words is reduced.

This object, in accordance with the invention, is achieved by means of a dictionary of an alphabetic foreign language comprising:

an information carrier;

a plurality of words of a foreign language, sequentially positioned on the information carrier;

wherein words of the aforesaid plurality of words, differing one from another by at least one letter and comprising an identical sequence of letters, comprising at least one third of the letters in a word, in the direction from the end to the beginning of a word, are combined into marked-off groups of words, and a translation is positioned on the carrier adjacent to each word of the foreign language;

wherein each aforesaid marked-off group of words is positioned sequentially with respect to another group of words, the aforesaid sequence of letters of which comprises the greatest number of letters coinciding with a corresponding sequence of letters of the first aforesaid group of words in the direction from the end to the beginning of a word;

and wherein the aforesaid marked-off groups of words are separated one from the other on the carrier by an unfilled space on the information carrier.

The aforesaid marked-off groups of words may be separated one from the other by marking an aforesaid corresponding group.

Furthermore, it is preferable that a transcription be positioned on the carrier adjacent to each word of the foreign language.

Wherein it is preferable that the aforesaid marked-off groups of words, in each of which the aforesaid sequence of letters contains the greatest identical number of coinciding letters for each group in the direction from the end to the beginning of a word, be positioned sequentially on the information carrier.

Furthermore, it is preferable that the words in the aforesaid groups of words, positioned on the information carrier, be lined up by the final letter, and the aforesaid sequences of letters in the words of the aforesaid groups be marked.

The invention is also aimed at creating a book, including:

pages, on which a plurality of words of a foreign language are sequentially positioned, wherein the words differing one from another by at least one letter and containing an identical sequence of letters comprising at least one third of the letters in a word in the direction from the end to the beginning of the word, are combined into marked-off groups, wherein each aforesaid marked-off group of words is positioned sequentially with another group of words, the aforesaid sequence of letters of which comprises the greatest number of letters coinciding with a corresponding sequence of letters of the first aforesaid group of words in the direction from the end to the beginning of a word; and sections, in each of which words of a foreign language have a coinciding final letter;

wherein at least one pair of columns is positioned on a page, in each pair of columns one column comprises words of a foreign language combined into the aforesaid sequential groups which are separated one from another by an empty space on a page, while the other column comprises a translation adjacent to each word of the foreign language in the first column.

The aforesaid marked-off groups of words can be separated one from another on pages of the book by marking the corresponding group.

Furthermore it is preferable that a transcription of the corresponding foreign word from the first column be provided in the second column adjacent to each word of the foreign language.

Wherein it is preferable that the aforesaid marked-off groups of words, in each of which the aforesaid sequence of letters contains the greatest identical number of coinciding letters for each of them in the direction from the end to the beginning of a word, be positioned sequentially on the pages of the book.

Furthermore, it is preferable that the words in the aforesaid groups of words positioned on the pages be lined up in the first column by the last letter, and that the aforesaid sequences of letters in the words be marked.

The advantage of the proposed dictionary lies in the fact that the sequentially positioned groups of words contain the largest number of identical final letters for each of them. After the identical final letters in the words of one such group are memorized, it is accordingly easier to memorize identical letters in the words of another adjacent group. This makes it possible to memorize a greater number of words in a shorter time.

BRIEF DESCRIPTION OF THE DRAWING

The invention will now be described in detail by concrete implementations of the invention with reference to the accompanying drawing in which FIG. 1 shows a fragment of a dictionary made in accordance with the invention.

DESCRIPTION OF THE PREFERRED EMBODIMENTS OF THE INVENTION

Fifteen words of a foreign language are used in FIG. 1 to explain the essence of the invention. These fifteen words are only used for illustration, wherewith the number of words of a foreign language in a dictionary made according to this invention may be from hundreds to tens of thousands.

In accordance with the invention, the dictionary may be made in the form of a book including sections, each of which comprises words of a foreign language which have an identical final letter. The book can have any construction with regard to binding, hard-cover or paperback, etc. In addition to the aforesaid sections, it may contain other sections, which are usually provided in publications with a dictionary-like list of words.

Sections 1 and 2 are shown in the drawing as an example. The words 3 of a foreign, for example English, language in each of these sections have an identical final letter. Section 1 comprises nine words which end with the letter "e." Section 2 comprises six words which end with the letter "t."

One pair of columns is provided on a page. Words 3 of a foreign language are sequentially positioned in the first column. These words are combined into marked-off groups 4, 5, 6 and 7 in section 1 and into marked-off groups 8, 9 and 10 in section 2. The words 3 are combined into the aforesaid groups according to sequentially positioned identical letters 11 in the direction from the end to the beginning of a word, which letters form repeating sequences 11 of letters. In group 7 the two words "resume" consist of sequentially identical letters and are memorized as one word according to spelling, and therefore there is no sense in putting them into an independent group of words.

The other column of the section contains the transcription 12 and translation 13, for example, into the German language, which are positioned accordingly adjacent to each foreign language word 3 in the first column.

Each marked-off group of words in the dictionary is positioned sequentially in respect of another group of words, the repeating sequence of letters of which contains the greatest number of letters which coincide with the corresponding sequence of letters of the first aforesaid group of words in the direction from the end to the beginning of the word. Thus, the sequence 11 in the words of group 4 has the greatest number of letters, in particular three, identical with the sequence 11 of letters in the words of group 5. This same remark is valid for group 5 with respect to group 4.

The sequence 11 in the words of group 6 has two identical letters with respect to the sequences 11 of letters in the words of groups 4, 5 and 7. This is also valid for group 7 with respect to groups 4, 5 and 6. In turn, the sequences 11 of letters in the words of groups 4 and 5 contain one and the same number of letters, in particular two, which are identical with the sequences 11 of letters in the words of groups 6 and 7. But these same sequences 11 of letters in the words of groups 4 and 5 have a greater number of identical letters with respect to each other than with respect to group 6 or 7. Therefore groups 4 and 5 are positioned sequentially with respect to each other, and group 6 or 7 is not positioned between groups 4 and 5.

Group 6 can be positioned before group 4, while group 7 may be positioned after group 5. And, to the contrary, group 7 may be positioned before group 4, while group 6 may be positioned after group 5. In order to accelerate the process of perceiving distinctions in the words of the foreign language, groups 6 and 7 are positioned sequentially with respect to one another, since in the aforesaid groups the repeating sequences of letters comprise one and the same, the greatest for each of them, number of identical letters. Thus, the sequentially positioned groups 6 and 7 are set apart from the groups in section 1. With equal success the sequentially positioned groups 6 and 7 can be positioned before the sequentially positioned groups 4 and 5 or after them as shown in the drawing.

In section 2 the sequence 11 of letters in the words of group 8 contains the greatest number of letters which are identical with those in the sequences 11 of the letters in the words of groups 9 and 10. This same remark is valid for group 9 with respect to groups 8 and 10, and also to group 10 with respect to groups 8 and 9. The sequences 11 of letters in the words of groups 8, 9 and 10 have one and the same, greatest for each of them, number of identical letters. The aforesaid groups may be positioned sequentially in any combination, for example, as shown in the drawing.

For convenient visual perception, each group of words of the foreign language is marked off from adjacent groups. In order to do this, the sequentially positioned groups 4, 5 and 6 are separated one from the other by a separating element, for example by a straight line 14. There is an empty space left on the carrier 15 between groups 6 and 7, 8 and 9, 9 and 10, and these empty spaces separate the aforesaid groups one from another. The repeating sequences 11 of final letters in the words of the foreign language are marked off by points 16, as shown in groups 4, 5, 6 and 7, or by a dash 17 in groups 8, 9 and 10. Words of a foreign language are lined up in a column by the final letter, as shown in section 1, or in a group, as shown in section 2. The elements 14, separating the groups of words one from another, as well as the words themselves and the repeating sequences 11 of the letters in the words of a group can be made by setting them down on another background and/or another color or with another font (size), or by using special lines, marks, symbols, points, etc.

In accordance with the preferable implementation of the invention, each page of the dictionary contains two pairs of columns, which makes it possible to use the area of the carrier rationally.

It is not technically difficult to form sequentially positioned groups from any number of words of a foreign language; knowledge of the foreign language, of transcription and translation is not required. Information carriers can be a sheet of paper, a magnetic tape, a floppy or hard disk, display, etc. Dictionaries are produced in the form of books, parts of books, brochures, tables, cards, calendars, magnetic tapes, disks, etc. They are placed in textbooks, teaching aids, handbooks, etc., and also in hardware.

The dictionary can be adapted to different age groups or levels of education, can be specialized depending on the field of knowledge or professional orientation of those studying the foreign language.

I claim:

1. A dictionary of an alphabetic foreign language comprising:

an information carrier;

a plurality of words of a foreign language, sequentially positioned on the information carrier;

wherein words of said plurality of words, differing one from another by at least one letter and comprising an identical sequence of letters, comprising at least one third of the letters in a word, in the direction from the end to the beginning of a word, are combined into marked-off groups of words, and a translation is positioned on the carrier adjacent to each word of the foreign language;

wherein each said marked-off group of words is positioned sequentially with respect to another group of words, said sequence of letters of which comprises a greatest number of letters coinciding with a corresponding sequence of letters of first said group of words in the direction from the end to the beginning of a word; and wherein said marked-off groups of words are separated one from another by an unfilled space on the information carrier.

2. A dictionary according to claim 1, including said marked-off groups of words, in each of which said sequence of letters in the direction from the end to beginning of a word contains the greatest identical number of coinciding letters for each of them, wherein such groups are positioned sequentially on the information carrier.

3. A dictionary according to claim 1, wherein the words in said groups of words positioned on a information carrier are lined up by the final letter, and said sequences of letters in the words of said groups are marked.

4. A dictionary according to claim 1, wherein at least two said marked-off groups of words are separated one from another by marking a corresponding group.

5. A dictionary according to claim 4, wherein said marked-off groups of words, in each of which said sequence of letters contains a greatest identical number of coinciding letters for each of them in the direction from the end to the beginning of a word, are positioned sequentially on the information carrier.

6. A dictionary according to claim 4, wherein words in said groups of words positioned on a information carrier are lined up by the final letter, and said sequences of letters in the words of said groups are marked.

7. A dictionary according to claim 1, wherein a transcription of a word is also positioned on the carrier adjacent to each corresponding word of the foreign language.

8. A dictionary according to claim 7, wherein said marked-off groups of words, in each of which said sequence of letters contains a greatest identical number of coinciding letters for each of them in the direction from the end to the beginning of a word, are positioned sequentially on the information carrier.

9. A dictionary according to claim 7, wherein the words in said groups of words positioned on the information carrier are lined up by the final letter, and said sequences of letters in the words of said groups are marked.

10. A dictionary according to claim 7, wherein at least two said marked-off groups of words are separated one from another by marking a corresponding group.

11. A dictionary according to claim 10, wherein said marked-off groups of words, in each of which said sequence of letters contain a greatest identical number of coinciding letters for each of them in the direction from the end to the beginning of a word, are positioned sequentially on the information carrier.

12. A dictionary according to claim 10, wherein the words in said groups of words positioned on a information carrier are lined up by the final letter, and said sequences of letters in the words of said groups are marked.

13. A book, including:

pages, on which a plurality of words of a foreign language are sequentially positioned, wherein the words differing one from another by at least one letter and comprising an identical sequence of letters, comprising at least one third of the letters in a word, in the direction from the end to the beginning of a word, are combined into marked-off groups of words, and a translation is positioned on the carrier adjacent to each word of the foreign language, wherein each said marked-off group of words is positioned sequentially with respect to another group of words, said sequence of letters of which comprises the greatest number of letters coinciding with a corresponding sequence of letters of first said group of words in the direction from the end to the beginning of a word; and sections, in each of which words of a foreign language have a coinciding final letter; and wherein at least one pair of columns is positioned on a page, in each pair of columns one column comprises words of a foreign language combined into said marked-off sequential groups of words which are separated one from another by an unfilled space on a page, while the other column comprises a translation adjacent to each word of the foreign language in the first column.

14. A book according to claim 13, wherein said marked-off groups of words, in each of which said sequence of letters contains a greatest identical number of coinciding letters for each of them in the direction from the end to the beginning of a word, are positioned sequentially on the pages.

15. A book according to claim 13, wherein the words in said groups of words positioned on the pages are lined up in the first column by the final letter, and said sequences of letters in the words of said groups are marked.

16. A book according to claim 13, wherein at least two said marked-off groups of words are separated one from another by marking said corresponding group.

17. A book according to claim 16, wherein said marked-off groups of words, in each of which said sequence of letters contains a greatest identical number of coinciding letters for each of them in the direction from the end to the beginning of a word, are positioned sequentially on the pages.

18. A book according to claim 16, wherein the words in said groups of words positioned on the pages are lined up in the first column by the final letter, and said sequences of letters in the words of said groups are marked.

19. A book according to claim 13, wherein a transcription of a word is also positioned in the second column of a page adjacent to each corresponding word of the foreign language.

20. A book according to claim 19, wherein said marked-off groups of words, in each of which said sequence of letters contains a greatest identical number of coinciding letters for each of them in the direction from the end to the beginning of a word, are positioned sequentially on the pages.

21. A book according to claim 19, wherein the words in said groups of words positioned on the pages are lined up in the first column by the final letter, and said sequences of letters in the words of said groups are marked.

22. A book according to claim 19, wherein at least two said marked-off groups of words are separated one from another by marking said corresponding group.

23. A book according to claim 22, wherein said marked-off groups of words, in each of which said sequence of letters contains a greatest identical number of coinciding letters for each of them in the direction from the end to the beginning of a word, are positioned sequentially on the pages.

24. A book according to claim 22, wherein the words in said groups of words positioned on the pages are lined up in the first column by the final letter, and said sequences of letters in the words of said groups are marked.

* * * * *